United States Patent
Nariyuki et al.

(10) Patent No.: US 8,791,420 B2
(45) Date of Patent: Jul. 29, 2014

(54) RADIATION IMAGING DEVICE

(75) Inventors: Fumito Nariyuki, Kanagawa (JP); Haruyasu Nakatsugawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 286 days.

(21) Appl. No.: 13/455,922

(22) Filed: Apr. 25, 2012

(65) Prior Publication Data

US 2012/0273687 A1 Nov. 1, 2012

(30) Foreign Application Priority Data

Apr. 28, 2011 (JP) ................. 2011-100668

(51) Int. Cl.
*G01T 1/20* (2006.01)
*G01T 1/24* (2006.01)

(52) U.S. Cl.
CPC .. *G01T 1/244* (2013.01); *G01T 1/20* (2013.01)
USPC ..................... 250/370.11; 250/366

(58) Field of Classification Search
CPC ......... G01T 1/2018; G01T 1/20; G01T 1/244; A61B 6/4233; A61B 6/4283; A61B 6/4452; H01L 27/14636; H01L 27/14659; H01L 27/14676; H01L 27/14683; H01L 27/14696
USPC ............... 250/366, 370.11; 257/59, 290, 293, 257/432, 448, 57, E21.002, E27.132, 257/E29.273, E31.091, E31.114; 438/56, 438/66

See application file for complete search history.

(56) References Cited

U.S. PATENT DOCUMENTS 7,714,295 B2    5/2010 Ohta et al.

FOREIGN PATENT DOCUMENTS

JP    2009-156936 A    7/2009

*Primary Examiner* — Mark R Gaworecki
(74) *Attorney, Agent, or Firm* — Jean C. Edwards, Esq.; Edwards Neils PLLC

(57) ABSTRACT

An electronic cassette has a top plate, an anisotropic heat transfer plate, a detection panel, and a scintillator disposed in this order from an X-ray irradiation side. The scintillator converts X-rays transmitted through the top plate, the anisotropic heat transfer plate, and the detection panel into visible light. The detection panel performs photoelectric conversion of the visible light. The anisotropic heat transfer plate is composed of a lamination of first prepregs in which all carbon fibers are oriented in a heat flow direction. The top plate is composed of an alternate lamination of the first prepregs and second prepregs that have carbon fibers oriented in a signal line direction. Body heat of a patient is transferred to the top plate, and is transferred in the heat flow direction in the anisotropic heat transfer plate, and then is released from a housing through heat absorbing members.

17 Claims, 9 Drawing Sheets

RADIATION IMAGING DEVICE

CROSS-REFERENCE TO RELATED APPLICATIONS

The present application claims priority from Japanese Patent Application No. 2011-100668 filed on Apr. 28, 2011, the contents of which are herein incorporated by reference in their entirety.

BACKGROUND OF THE INVENTION

1. Field of the Invention

The present invention relates to a radiation imaging device that converts radiation into visible light and obtains a radiographic image.

2. Description Related to the Prior Art

As a type of medical imaging system using radiation such as X-rays, an X-ray image capturing system is known. The X-ray image capturing system is constituted of an X-ray generating apparatus for applying the X-rays to a patient's body part to be examined, and an X-ray image capturing apparatus for taking an X-ray image of the body part. The X-ray image capturing apparatus has a radiation imaging device that captures a radiographic image as an electric image. A type of radiation imaging device using a FPD (flat panel detector) is recently in practical use. The FPD has a detection surface formed of a matrix of pixels each of which accumulates signal charge by an amount corresponding to an amount of the X-rays incident thereon. In the FPD, the signal charge is accumulated in the detection surface on a pixel-by-pixel basis, and the accumulated signal charge i.e. the detected X-ray image is outputted in the form of digital image data.

There are known two types of FPD, that is, a direct conversion type and an indirect conversion type. In the direct conversion type FPD, the X-rays are directly converted into the signal charge by a conversion layer made of amorphous selenium or the like. In the indirect conversion type FPD, the X-rays are temporarily converted into visible light, and the visible light is converted into the signal charge. The indirect conversion type FPD is constituted of a scintillator for converting the X-rays into the visible light, a detection panel opposed to the scintillator, and an electric control circuit. The detection panel has the detection surface in which a photoelectric conversion layer for producing the signal charge by photoelectric conversion is formed on a pixel-by-pixel basis on an electrical insulating substrate such as a glass substrate. Thus, the detection panel converts the visible light from the scintillator into the signal charge, and accumulates the signal charge.

The FPD is used in the form of an FPD cassette (electronic cassette), in which the FPD is contained in a flat portable housing, in addition to a state of being set in a floor-mounted imaging support for taking a radiograph of the patient in a standing or lying position. The electronic cassette is formed into the same size as a conventional radiographic cassette, including a film cassette using an X-ray photographic film and an IP cassette using an IP (imaging plate). For this reason, the electronic cassette can be used in the conventional X-ray image capturing system designed for the conventional radiographic cassette, and this is especially convenient when taking a radiograph of a body part (for example, elbow or knee) that is hard to take with the floor-mounted system. Furthermore, the electronic cassette can be used for bedside radiography, which is carried out for the patient who cannot move from his/her bed.

There are three essential conditions required of the housing of the electronic cassette. Firstly, the housing must be lightweight enough to enable portability. Secondly, the housing must be highly X-ray transparent, because a front surface of the housing becomes an X-ray irradiation surface through which the X-rays enter the FPD. Thirdly, the X-ray irradiation surface of the housing must have rigidity enough to endure a load imposed by the patient's body part, because when the electronic cassette detached from the imaging support is used on a bed or a table, the body part to be examined is put on the X-ray irradiation surface of the housing.

To satisfy the essential conditions required of the housing of the electronic cassette, according to Japanese Patent Laid-Open Publication No. 2009-156936, a top plate disposed in the X-ray irradiation surface of the housing is made of CFRP (carbon-fiber reinforced plastic), for example, being a lightweight, rigid, and highly X-ray transparent carbon material. The general CFRP is formed of a lamination of prepregs. Each prepreg is made of carbon fibers oriented in one direction and impregnated with resin. In the CFRP, the prepregs are laminated such that the orientation of the carbon fibers differs between any of the two prepregs overlapping each other.

With the aim of making uniform temperature distribution of the detection panel, according to another conventional X-ray imaging device, an anisotropic heat transfer carbon sheet is disposed on an X-ray incident side of the detection panel (refer to U.S. Pat. No. 7,714,295 corresponding to Japanese Patent Laid-Open Publication No. 2009-085639, for example).

The detection panel of the FPD is more sensitive to temperature change than the X-ray photographic film or the IP. Thus, temperature variations occurring in the detection surface of the detection panel easily manifest themselves in the form of image density variations. In the electronic cassette, a projection plane of the top plate of the housing is overlaid on the detection surface of the detection panel. The top plate and the detection panel are disposed near to each other or make tightly contact with each other to slim the housing. For this reason, heat of the top plate is easily transferred to the detection panel. If the temperature variations occur in the top plate by a partial temperature increase, the temperature variations occur in the detection panel. When the electric charge accumulated in each pixel of the detection panel is read out by a readout circuit through plural signal lines, the heat sometimes interferes with the operation of the readout circuit, and causes noise in the X-ray image.

The indirect type FPD adopts either an ISS (irradiation side sampling) method or a PSS (penetration side sampling) method between which the layout of the scintillator and the detection panel is different. In the ISS method, the top plate, the detection panel, and the scintillator are disposed in this order from an X-ray irradiation side, such that an X-ray incident surface of the scintillator is opposed to the detection surface of the detection panel. In the PSS method, on the other hand, the top plate, the scintillator, and the detection panel are disposed in this order, and the detection panel detects the visible light that has reached a surface opposite to the X-ray incident surface of the scintillator. The ISS method is superior in detection efficiency, because the visible light produced in the X-ray incident surface of the scintillator is received immediately by the detection panel without attenuation. In the ISS method, however, the detection panel is nearer to the top plate, and hence is more susceptible to heat from the top plate than in the PSS method.

For making the detection panel thin or flexible, it is studied to change the substrate of the detection panel from the conventional glass substrate to a resin substrate, or to omit the substrate itself. In this case, the heat of the top plate is transferred to the pixels more easily, so further affects the performance of the detection panel.

The Japanese Patent Laid-Open Publication No. 2009-156936 does not disclose the temperature variations caused by body heat of the patient transferred from the top plate to the detection panel, and measures against the temperature variations. The U.S. Pat. No. 7,714,295 aims to reduce the temperature variations caused by heat produced by the detection panel itself, and never discloses prevention of the temperature variations caused by the body heat of the patient transferred from the top plate.

SUMMARY OF THE INVENTION

An object of the present invention is to provide a radiation imaging device that prevents the occurrence of temperature variations in a detection panel caused by heat transferred from a top plate of a housing.

A radiation imaging device according to the present invention includes a radiation detector, a housing, and an anisotropic heat transfer plate. The radiation detector detects radiation transmitted through an object to be examined. The radiation detector has a scintillator and a detection panel. The scintillator converts the radiation incident upon an incident surface into visible light. The detection panel has a detection surface having a two-dimensional array of pixels each for converting the visible light emitted from the scintillator into an electric signal. The detection surface is opposed to the incident surface of the scintillator. The housing has a top plate in an irradiation surface irradiated with the radiation. The housing contains the radiation detector in such a position that the detection panel is faced to the top plate. The anisotropic heat transfer plate is disposed between the top plate and the detection panel in the housing so as to tightly contact both the top plate and the detection panel, for transferring heat in a specific first direction.

The first direction of the anisotropic heat transfer plate preferably differs from an extending direction of a signal line through which the electric signal is read out from the pixels of the detection panel.

The anisotropic heat transfer plate preferably has a plurality of carbon fibers oriented in one direction. The first direction of the anisotropic heat transfer plate preferably coincides with an orientation of the carbon fibers.

It is preferable that each of the top plate and the anisotropic heat transfer plate is formed of a lamination of prepregs, and each prepreg is made of carbon fibers oriented in one direction and impregnated with resin. In the anisotropic heat transfer plate, the orientation of the carbon fibers of all the prepregs is substantially the same, and the first direction of the anisotropic heat transfer plate coincides with the orientation of the carbon fibers. In the top plate, the orientation of the carbon fibers differs between any of the two prepregs overlapping each other. The orientation of the carbon fibers of the prepreg of a lowermost layer of the top plate corresponding to a rear surface of the top plate is substantially the same as the orientation of the carbon fibers of the prepregs of the anisotropic heat transfer plate.

The carbon fibers may be pitch-based carbon fibers. The top plate, the anisotropic heat transfer plate, and the detection panel may be joined with pressure, or bonded to each other.

The top plate and the anisotropic heat transfer plate may be glued together with a first adhesive layer. The anisotropic heat transfer plate and the detection panel may be glued together with a second adhesive layer. At this time, at least one of the first and second adhesive layers is preferably composed of plural adhesive sections arranged in a direction orthogonal to the orientation of the carbon fibers of the anisotropic heat transfer plate.

The anisotropic heat transfer plate is preferably provided with a heat absorbing member on a side in the first direction. The heat absorbing member may be thermally bonded to the housing.

The housing may be in shape of a box having a front frame and a rear frame, and the top plate may be fitted into said front frame. The front frame and the rear frame may be made of metal.

The anisotropic heat transfer plate and the radiation detector may be attached to the front frame. A base board for blocking the radiation may be attached to the rear frame, and at least one circuit board may be mounted on a rear surface of the base board.

The detection panel and the circuit board may be connected with at least one flexible cable. The flexible cable may extend from a side of the detection panel in the extending direction of the signal line, and the flexible cable may be mounted with an IC chip designed for reading out the electric signal from each of the pixels of the detection panel.

The anisotropic heat transfer plate may be provided with a heat absorbing member on a side in the first direction, and the heat absorbing member may make contact with the front frame of the housing.

Each pixel may have a photodiode made of amorphous silicon or an organic photoelectric conversion material.

According to the present invention, the anisotropic heat transfer plate is disposed between the top plate and the detection panel in the housing. Thus, it is possible to prevent the occurrence of temperature variations in a detection surface of the detection panel caused by heat transferred from the top plate of the housing.

The anisotropic heat transfer plate made of carbon fibers has high radiation transparency, and can transfer and release the heat from the top plate in an arbitrary direction, because the heat flow direction of the anisotropic heat transfer plate depends on the orientation of the carbon fibers. Furthermore, the orientation of the carbon fibers in the lowermost layer of the top plate corresponding to the rear surface of the top plate is made substantially the same as the orientation of the carbon fibers of the anisotropic heat transfer plate. Therefore, the heat is efficiently transferred from the top plate to the anisotropic heat transfer plate.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

Figure 1:
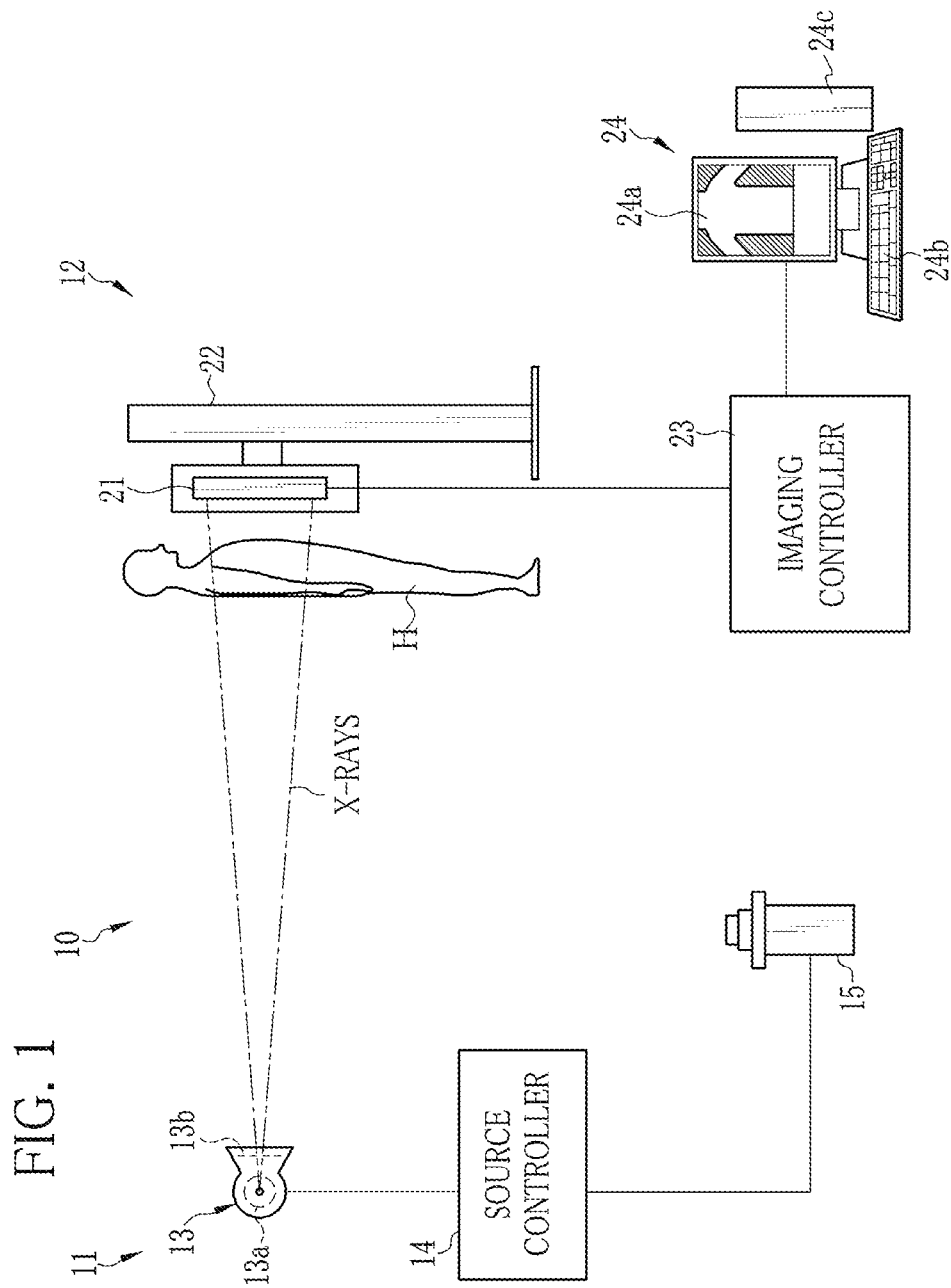
FIG. 1 is a schematic view of an X-ray image capturing system using an electronic cassette.

As shown in FIG. 1, a radiation image capturing system, for example, an X-ray image capturing system 10 is constituted of an X-ray generating apparatus 11 and an X-ray image capturing apparatus 12. The X-ray generating apparatus 11 has an X-ray source 13, a source controller 14 for controlling the X-ray source 13, and an exposure switch 15. The X-ray source 13 has an X-ray tube 13a for emitting X-rays, and a collimator 13b for limiting an irradiation field of the X-rays emitted from the X-ray tube 13a.

The X-ray tube 13a has a cathode composed of a filament for emitting thermoelectrons, and an anode (target) for radiating the X-rays by collision of the thermoelectrons emitted from the cathode. The collimator 13b is composed of, for example, a plurality of X-ray shielding lead plates disposed along each side of a rectangle so as to form a rectangular irradiation opening in a middle through which the X-rays propagate. Changing the position of the lead plates can vary the size of the irradiation opening to limit the irradiation field.

As is well known, the source controller 14 includes a high voltage generator and a controller. The high voltage generator supplies a high voltage to the X-ray source 13. The controller controls a tube voltage for determining an energy spectrum of the X-rays from the X-rays source 13, a tube current for determining an X-ray irradiation amount per unit of time, and an X-ray irradiation duration. The high voltage generator produces the high tube voltage by multiplying an input voltage using a transformer, and supplies a drive power to the X-ray source 13 through a high voltage cable. Image capturing conditions including the tube voltage, the tube current, and the X-ray irradiation duration are set up manually by a doctor or an operator from an operation panel of the source controller 14 or from an imaging controller 23 through a communication cable.

The exposure switch 15 inputs an operation signal to the source controller 14. The exposure switch 15 is a two-step switch. Upon a press of a first step, a warm-up start signal is inputted to start warming up the X-ray source 13. Upon a press of a second step, an irradiation start signal is inputted to start emitting the X-rays.

The X-ray image capturing apparatus 12 has an electronic cassette 21, an imaging support 22, the imaging controller 23, and a console 24. The electronic cassette 21 is constituted of an FPD 31 (see FIG. 3) and a portable housing 26 (see FIG. 2) containing the FPD 31. This electronic cassette 21 is just an example of an X-ray imaging device, which forms an X-ray image by reception of the X-rays that have been emitted from the X-ray source 13 and transmitted through a body part to be examined of a patient H. The housing 26 of the electronic cassette 21 is in the shape of a flat box. The external size of the housing 26 is compatible with international standard ISO4090:2001 just as with a photographic film cassette or an IP cassette of a half size (383.5 mm×459.5 mm), for example. The housing 26 is rectangular in plan at a rear surface, which is opposite to a front surface being an irradiation surface 26a (see FIG. 2) with the X-rays.

The imaging support 22 has a slot to detachably attach the electronic cassette 21. The imaging support 22 holds the electronic cassette 21 in such a position that the irradiation surface 26a of the electronic cassette 21 faces to the X-ray source 13. Since the size of the housing 26 of the electronic cassette 21 is the same as those of the photographic film cassette and the IP cassette, the electronic cassette 21 can be attached to a conventional imaging support. As the imaging support 22, an upright imaging support for taking a radiograph of the patient H in a standing position is shown in the drawing, but a horizontal imaging support for taking a radiograph of the patient H in a lying position may be used instead.

The imaging controller 23 is communicatably connected to the electronic cassette 21 with or without a wire to control the electronic cassette 21. To be more specific, the imaging controller 23 issues the image capturing conditions to the electronic cassette 21 to set up signal processing conditions of the FPD 31 (including a gain of an integration amplifier for amplifying a voltage corresponding to signal charge, for example). The imaging controller 23 also receives a synchronization signal from the X-ray generating apparatus 11, and transfers the synchronization signal to the electronic cassette 21 to bring the FPD 31 into synchronization with the X-ray source 13. The imaging controller 23 further receives image data from the electronic cassette 21, and transfers the image data to the console 24.

The console 24 receives an input of an examination order including information of a sex, an age, the body part to be examined, and an examination purpose of the patient H, and displays the examination order on a monitor 24a. The examination order is inputted from an external system such as a HIS (hospital information system) or a RIS (radiography information system) for managing examination information related to patient's information and radiography information, or inputted manually by the doctor or the operator from a keyboard 24b. The doctor checks the contents of the examination order on the monitor 24a, and chooses the appropriate image capturing conditions in an operation screen displayed on the monitor 24a in accordance with the contents. The chosen image capturing conditions are sent to the imaging controller 23.

The console 24 applies image processes to data of the X-ray image transferred from the imaging controller 23. The processed X-ray image is written to data storage devices, including a hard disk and a memory contained in a console main unit 24c and an image server connected to the console 24 through a network, in addition to being displayed on the monitor 24a.

Figure 2:
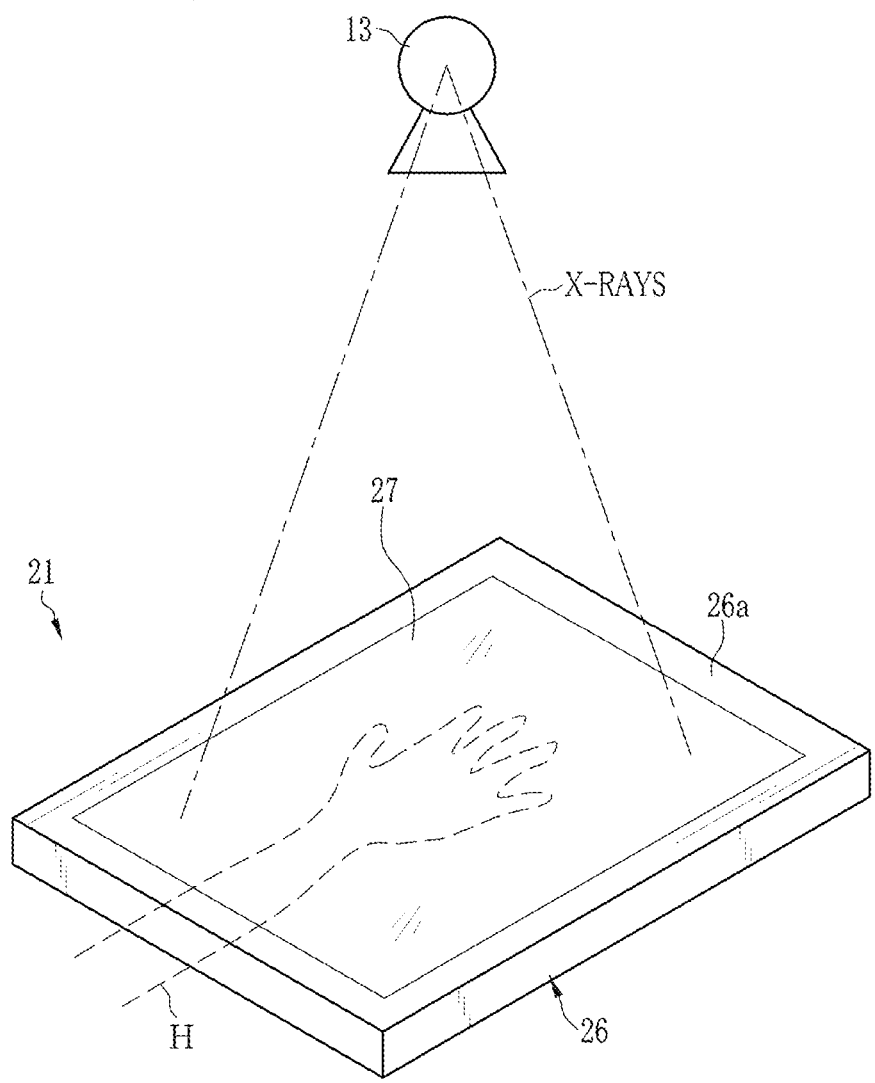
FIG. 2 is an external perspective view of the electronic cassette.

As shown in FIG. 2, when taking a radiograph of the body part e.g. a hand or a foot that is hard to handle with the electronic cassette 21 being attached to the imaging support 22, the electronic cassette 21 is detached from the imaging support 22. In taking a radiograph of the hand, the electronic cassette 21 is put on a bed or a table with the irradiation surface 26a of the housing 26 facing upward, for example. The hand of the patient H is put on the middle of the irradiation surface 26a. Almost the entire irradiation surface 26a except for a frame is composed of an X-ray transparent top plate 27. When the electronic cassette 21 is used by itself, the radiograph is taken with the body part of the patient H directly contacting the top plate 27.

Figure 3:
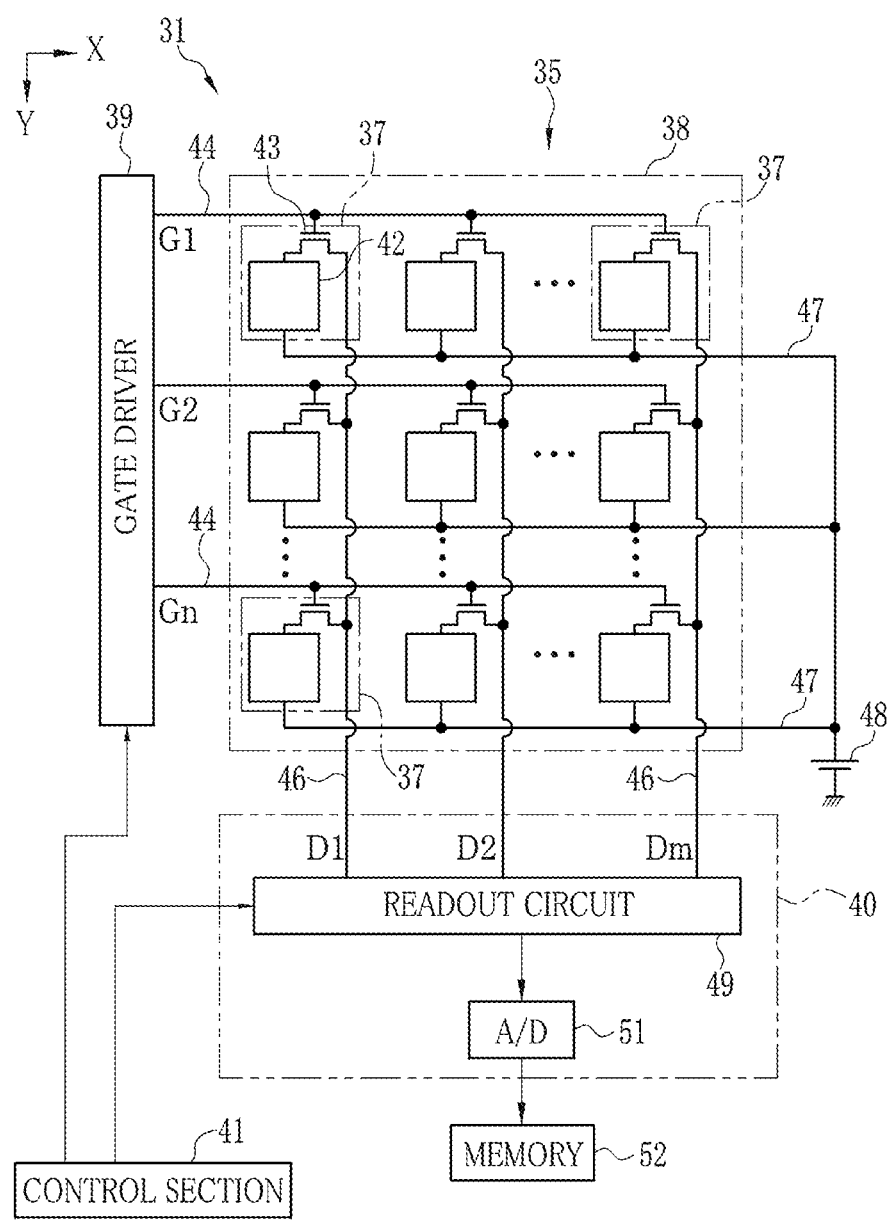
FIG. 3 is a schematic view of an FPD.

As shown in FIG. 3, the FPD 31 is provided with a detection panel 35, a gate driver 39, a signal processing section 40, and a control section 41. The detection panel 35 includes a detection surface 38 having an array of pixels 37 each of which accumulates signal charge by an amount corresponding to an amount of the X-rays incident thereon. The gate driver 39 controls readout of the signal charge by driving the pixels 37. The signal processing section 40 converts the signal charge read out of the pixels 37 into digital data, and outputs the digital data. The control section 41 controls the gate driver 39 and the signal processing section 40, for centralized control of the FPD 31. The pixels 37 are arranged into a two-dimensional matrix with n rows (X direction) and m columns (Y direction) at a predetermined pitch.

The FPD 31 is of an indirect conversion type, which temporarily converts the X-rays into visible light and then performs photoelectric conversion of the visible light to accumulate the signal charge. The detection panel 35 is a photoelectric conversion panel in which each pixel 37 performs the photoelectric conversion of the visible light. A scintillator 61 (see FIGS. 4 and 5), which converts the X-rays into the visible light, is put over the detection surface 38 of the detection panel 35. The scintillator 61 is made of a phosphor such as CsI (cesium iodide) or GOS (gadolinium oxysulfide). The scintillator 61 is in the form of a sheet in which the phosphor is applied to a support structure, and is glued on the detection surface 38 with an adhesive. In another case, the scintillator 61 may be formed on the detection surface 38 by evaporation of the phosphor or the like. In this embodiment, the scintillator 61 and the detection panel 35 are integrated into one unit.

The detection surface 38 is a rectangle of the half size (383.5 mm×459.5 mm) in shape. The top plate 27 is also a rectangle the size of which corresponds to the size of the detection surface 38.

The pixel 37 includes a photodiode 42, a capacitor, and a thin film transistor (TFT) 43. The photodiode 42 being a photoelectric conversion element produces the electric charge (electron and hole pairs) upon entry of the visible light. The capacitor accumulates the electric charge produced by the photodiode 42. The TFT 43 functions as a switching element. The detection panel 35 is a TFT active matrix substrate in which the pixels 37 are formed on an insulating substrate such as a glass substrate 71 (see FIG. 5).

The photodiode 42 is composed of a photoelectric conversion film being a semiconducting layer (for example, a PIN type) of a-Si (amorphous silicon), and upper and lower electrodes disposed on the top and bottom of the semiconducting layer. The lower electrode of the photodiode 42 is connected to the TFT 43. The upper electrode of the photodiode 42 is connected to a bias line 47 to which a bias voltage is applied from a bias power source 48. Since the application of the bias voltage produces an electric field in the semiconducting layer, the electric charge (electron and hole pairs) produced in the semiconducting layer by the photoelectric conversion are attracted to the upper and lower electrodes, one of which has positive polarity and the other has negative polarity. Thereby, the electric charge is accumulated in the capacitor.

A gate electrode of the TFT 43 is connected to a scan line 44. A source electrode of the TFT 43 is connected to a signal line 46, and a drain electrode is connected to the photodiode 42.

The scan lines 44 and the signal lines 46 are routed into a lattice. The number of the scan lines 44 coincides with the number of the rows of the pixels 37 arranged in the detection surface 38, and is "n" in this embodiment. The number of the signal lines 46 coincides with the number of the columns of the pixels 37, and is "m" in this embodiment. The scan lines 44 are connected to the gate driver 39, and the signal lines 46 are connected to a readout circuit 49.

The readout circuit 49 includes integration amplifiers and a multiplexer. The integration amplifiers convert the electric charge read out of the detection panel 35 into voltage signals. The multiplexer successively switches among the columns of the pixels 37 in the detection surface 38 to successively output the voltage signals one by one. The voltage signals read out by the readout circuit 49 is converted into digital data by an A/D converter 51. The digital data is written to a memory 52 as digital image data.

Figure 4:
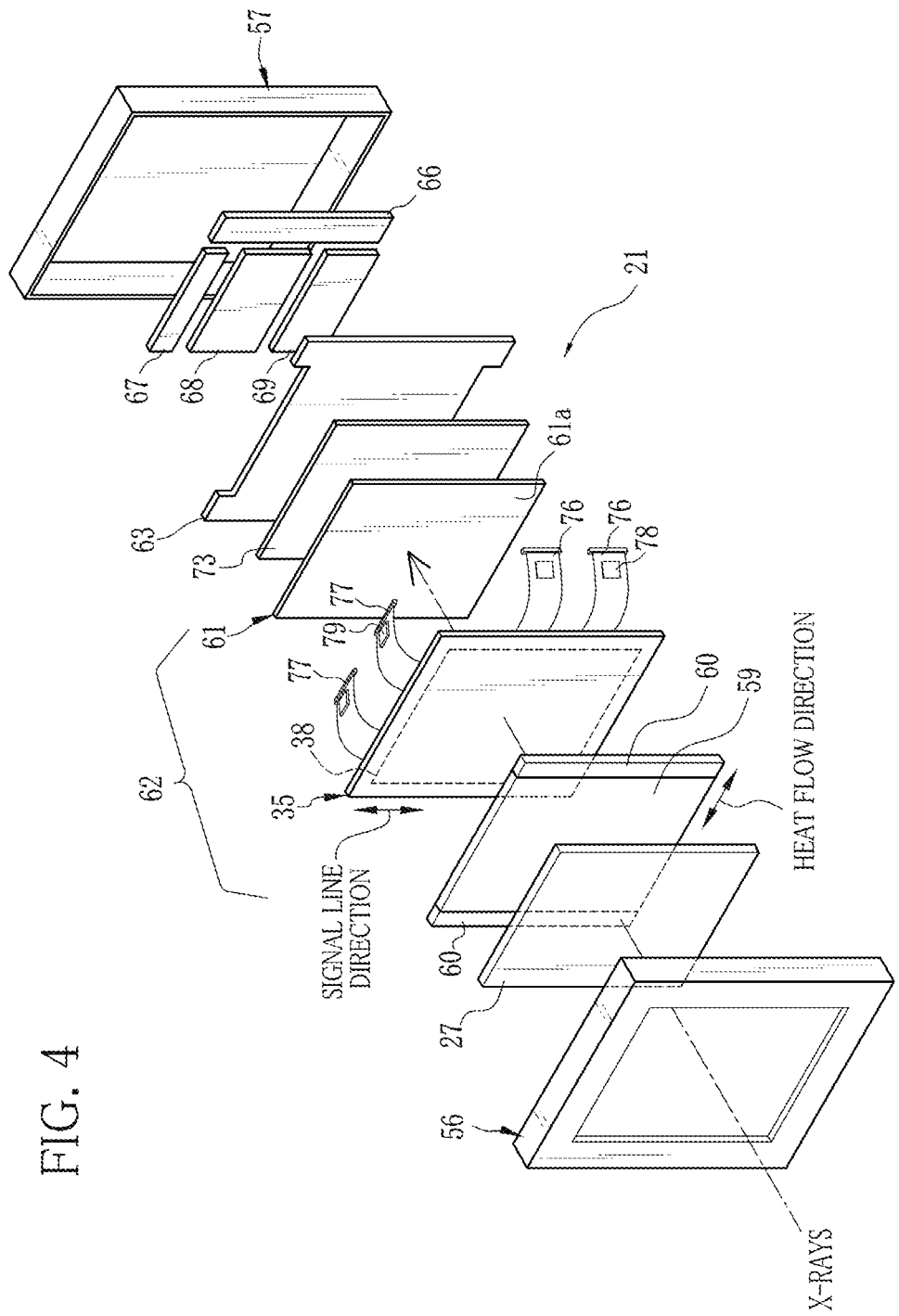
FIG. 4 is an exploded perspective view of the electronic cassette.
Figure 5:
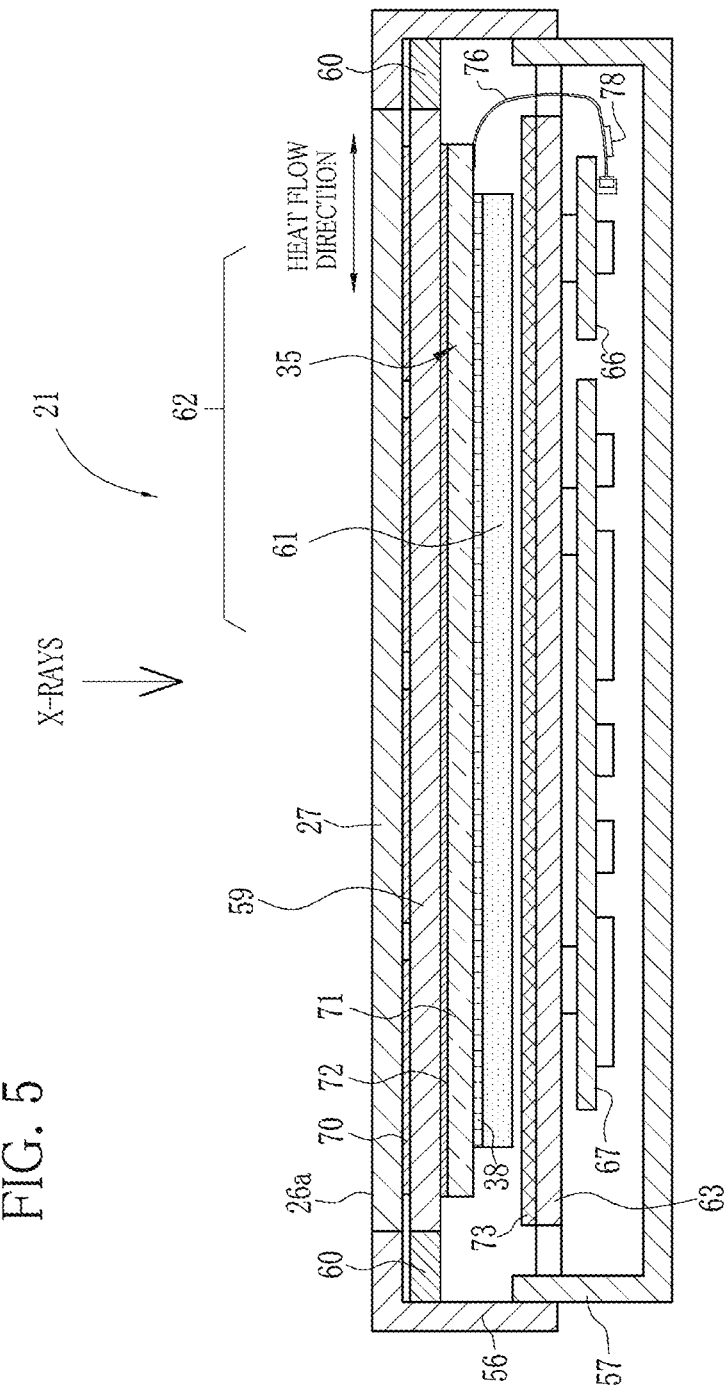
FIG. 5 is a sectional view of the electronic cassette.

As shown in FIGS. 4 and 5, the detection panel 35 and the scintillator 61 compose a radiation detector 62. The detection panel 35 and the scintillator 61 are integrated into one unit, and therefore called a panel unit. Note that, the detection panel 35 and the scintillator 61 may be isolated before being contained in the housing 26.

The housing 26 is constituted of a front frame 56, a rear frame 57, and the top plate 27. The front frame 56 composes the irradiation surface 26a, and covers the front of the panel unit 62. The rear frame 57 covers the panel unit 62 from behind. The front frame 56 is formed with an opening for fitting the top plate 27 therein. The top plate 27 is made of a carbon material that has lightweight, high rigidity, and high X-ray transparency. The front and rear frames 56 and 57 are made of metal such as stainless. The top plate 27 and the panel unit 62 sandwich an anisotropic heat transfer plate 59. A base board 63 and circuit boards 66 to 69 are disposed on a rear side of the panel unit 62 in the housing 26. Note that, the top plate 27 may compose the entire top surface of the front frame 56, and furthermore, may compose the entire front frame 56.

The thermal conductivity of the anisotropic heat transfer plate 59 is different from direction to direction. Generally speaking, the thermal conductivity is high in a specific direction (first direction), while is low in the other directions. This specific first direction with the high thermal conductivity is referred to as a heat flow direction. For example, when the anisotropic heat transfer plate 59 is made of an arrangement of carbon fibers, the heat flow direction coincides with a longitudinal direction of the carbon fibers, so almost all heat is transferred in the heat flow direction.

In the electronic cassette 21 of an ISS (irradiation side sampling) method, the panel unit 62 is positioned such that the detection panel 35 and the scintillator 61 are disposed in this order from the side of the irradiation surface 26a of the housing 26, and an X-ray incident surface 61a of the scintillator 61 is opposed to the detection surface 38 of the detection panel 35.

The X-rays incident upon the scintillator 61 attenuates while propagating in a thickness direction of the electronic cassette 21. The visible light emitted in the scintillator 61 also attenuates while propagating in the scintillator 61. Thus, the light emission amount of the scintillator 61 becomes its maximum at the X-ray incident surface 61a on which the X-rays are incident. In the ISS method, the maximum amount of light produced at the X-ray incident surface 61a of the scintillator 61 enters the detection surface 38 of the detection panel 35. Therefore, the ISS method is superior in light detection efficiency to a PSS (penetration side sampling) method. The ISS method is also called rear side irradiation method, because the X-rays are incident upon a rear side of the detection panel 35 being an opposite side of the detection surface 38.

To slim the housing 26, the anisotropic heat transfer plate 59 is glued on a rear surface of the top plate 27 with a first adhesive layer 70. The panel unit 62 is glued on the anisotropic heat transfer plate 59 with a second adhesive layer 72 such that the glass substrate 71 of the detection panel 35 is opposed to a rear surface of the anisotropic heat transfer plate 59. The circuit boards 66 to 69 are mounted on the base board 63. The base board 63 is made of stainless, for example. A lead plate is glued on a surface of the base board 63 to prevent the X-rays from entering the circuit boards 66 to 69. A heat insulating material 73 is disposed between the base board 63 and a rear side of the scintillator 61 opposite to the X-ray incident surface 61a, to prevent transfer of heat produced by the circuit boards 66 to 69 to the detection panel 35. The heat insulating material 73 is formed of a sponge sheet, for example.

The circuit board 66 is formed with circuit elements that compose the gate driver 39 for driving the TFTs of the detection panel 35. The circuit board 67 is formed with circuit elements that compose the A/D converter 51. The circuit board 68 is formed with circuit elements that compose the control section 41. The circuit board 69 is formed with circuit elements that compose a power source circuit (AC-DC converter, DC-DC converter, and the like).

The circuit board 66 is connected to the detection panel 35 through flexible cables 76. The circuit board 67 is connected to the detection panel 35 through flexible cables 77. Each flexible cable 76 has an IC chip 78 mounted thereon, and each flexible cable 77 has an IC chip 79 mounted thereon. Each of the IC chips 78 and 79 is packaged in a TCP (tape carrier package). The IC chip 78 contains a shift resistor that shifts a choice of the pixels 37 on a row-by-row basis and the like, and composes the gate driver 39 together with the circuit elements formed in the circuit board 66. The IC chip 79 is an ASIC composing the readout circuit 49. Thus, the plural signal lines 46 for reading out the signal from the pixels 37 of the detection panel 35 extend in a signal line direction being a vertical direction of FIG. 4. The flexible cables 77 having the IC chips 79 extend in this signal line direction.

In the ISS method, the scintillator 61 is not disposed between the detection panel 35 and the top plate 27, in contrast to the PSS method. Thus, the detection panel 35 is situated nearer to the top plate 27 in the ISS method than in the PSS method, so the temperature of the top plate 27 is easily transferred to the detection panel 35. The top plate 27 overlaps with the detection surface 38 of the detection panel 35 in a projection plane. Therefore, when temperature variations occur in the top plate 27, the heat of the top plate 27 is transferred to the detection panel with reflection of the temperature variations. The sensitivity and dark current characteristics of the photodiodes 42 have temperature dependence. Accordingly, the temperature variations occurring in the detection surface 38 manifest themselves in the form of density variations in a read image.

The signal charge accumulated in each pixel 37 of the detection panel 35 is read out by the readout circuit 49 through the signal lines 46 routed in the detection surface 38 of the detection panel 35. Thus, when the readout circuit 49 is affected by heat, noise may occur in the X-ray image.

When taking a radiograph of a hand of the patient H in a state of contacting the top plate 27, as shown in FIG. 2, for example, body heat transferred from a palm and fingers of the patient H causes partial increase of the temperature of the top plate 27, and brings about density variations in an image of the hand or fingers. Furthermore, when the temperature of the readout circuit 49 is increased due to the body heat of the patient H, the noise possibly occurs in the X-ray image.

In this embodiment, aiming to prevent the density variations and the occurrence of noise caused by the partial temperature increase of the top plate 27, the anisotropic heat transfer plate 59 having anisotropic heat transfer characteristics is disposed between the top plate 27 and the detection panel 35 so as to make contact with the top plate 27. By the way, the readout circuit 49 susceptible to heat is disposed in the signal line direction of the detection panel 35, and the heat should not be transferred to the readout circuit 49. For this reason, the anisotropic heat transfer plate 59 is disposed such that the heat flow direction of the anisotropic heat transfer plate 59 intersects the signal line direction at right angles.

As shown in FIGS. 4 and 5, heat absorbing members 60 are attached to both sides of the anisotropic heat transfer plate 59 in the heat flow direction, so as to contact an interior wall of the front frame 56. The heat absorbing members 60 transfer heat of the anisotropic heat transfer plate 59 to the housing 26. The heat absorbing members 60 are made of metal having high thermal conductivity such as aluminum, for example.

Figure 6:
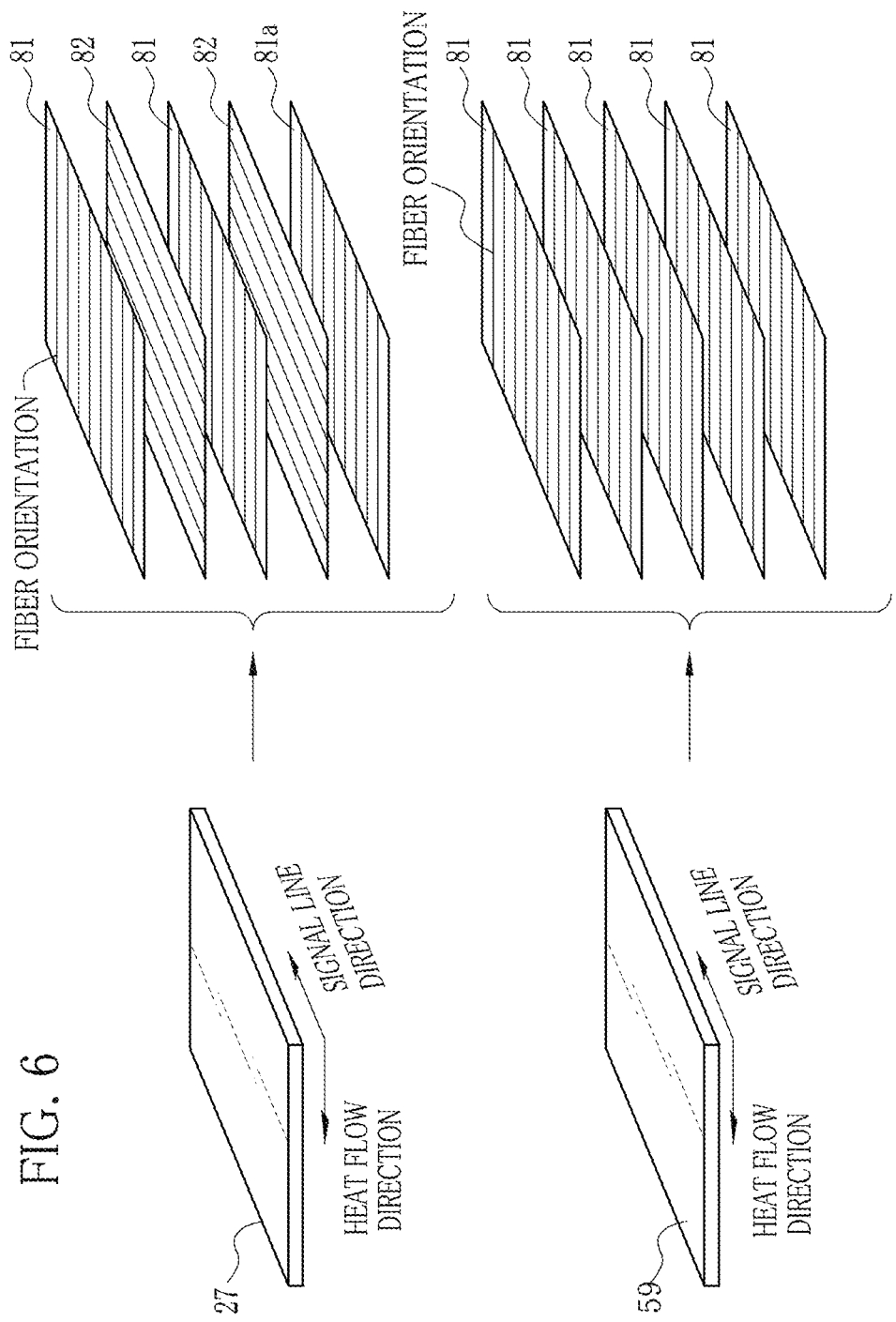
FIG. 6 is an explanatory view of layer structure of a top plate and an anisotropic heat transfer plate.

As shown in FIG. 6, the anisotropic heat transfer plate 59 is made of CFRP (carbon-fiber reinforced plastic) composed of a lamination of first prepregs 81. Each first prepreg 81 is made of carbon fibers oriented in a certain direction and impregnated with resin. All the first prepregs 81 are disposed such that the orientation of the carbon fibers coincides with the heat flow direction. All the first prepregs 81 are integrated by application of heat and pressure. Since the anisotropic heat transfer plate 59 made of the carbon fibers has high X-ray transparency, the anisotropic heat transfer plate 59 does not cause attenuation of the X-rays even if it is disposed between the top plate 27 and the detection panel 35.

The top plate 27 is made of the CFRP, as with the anisotropic heat transfer plate 59. However, the top plate 27 is composed of the first prepregs 81 in which the orientation of the carbon fibers coincides with the heat flow direction, and second prepregs 82 in which the orientation of the carbon fibers coincides with a direction different from that of the first prepregs 81, for example, the signal line direction. The first and second prepregs 81 and 82 are laminated alternately. Note that, a first prepreg 81a is used as the lowermost layer of the top plate 27 on the rear surface with which the anisotropic heat transfer plate 59 makes contact. The first and second prepregs 81 and 82 are integrated by application of heat and pressure, as in the case of the anisotropic heat transfer plate 59. The number of the prepregs 81 and 82 composing each of the top plate 27 and the anisotropic heat transfer plate 59 is five in the drawing for the sake of brevity, but is of the order of ten in actual fact.

Since the top plate 27 is composed of the first and second prepregs 81 and 82 that have the different fiber orientations and are laminated alternately, the top plate 27 has rigidity enough to endure a load imposed by the patient's body part. The heat flow direction of the CFRP being the lamination of the prepregs depends on the entire lamination. However, when heat is transferred from one surface of the CFRP to another member, the heat is transferred in a heat transfer direction of the outermost prepreg, that is, the fiber orientation of the outermost prepreg. Accordingly, in this embodiment, the first prepreg 81a that has the fiber orientation coinciding with the heat flow direction of the anisotropic heat transfer plate 59 is provided as the lowermost layer of the top plate 27, for the purpose of improving thermal conduction efficiency from the top plate 27 to the anisotropic heat transfer plate 59.

Figure 7:
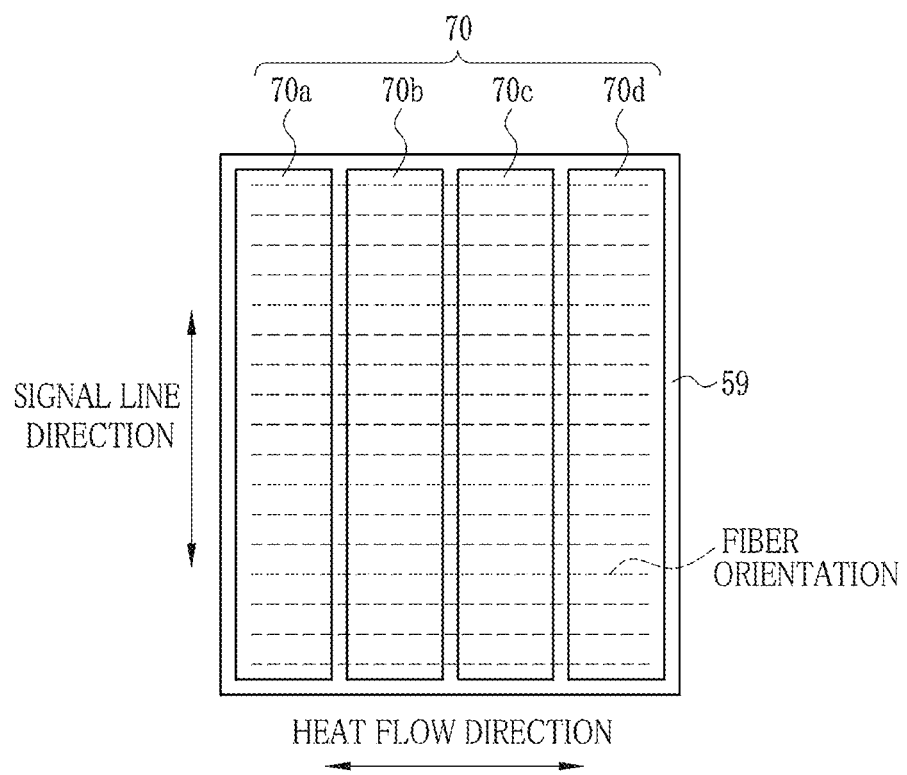
FIG. 7 is a plan view of a first adhesive for gluing the top plate on the anisotropic heat transfer plate.

As shown in FIG. 5, the detection panel 35 and the anisotropic heat transfer plate 59 are glued to each other with the second adhesive layer 72 extending in an entire adhesive surface. On the other hand, the top plate 27 and the anisotropic heat transfer plate 59 are glued to each other with the first adhesive layer 70, as shown in FIG. 7, which is composed of plural adhesive sections 70a to 70d arranged in a direction orthogonal to the fiber orientation of the anisotropic heat transfer plate 59.

The anisotropic heat transfer plate 59 is bendable in a direction parallel to the fiber orientation, because every carbon fiber is evenly directed to the heat flow direction. In this embodiment, gluing the top plate 27 and the anisotropic heat transfer plate 59 together with the first adhesive layer 70, which has the plural adhesive sections 70a to 70d arranged in the direction orthogonal to the fiber orientation, can improve flexural strength of the anisotropic heat transfer plate 59 in the direction parallel to the carbon fibers. The improved flexural strength can increase the resistance to the load of the patient H. Furthermore, for example, when the electronic cassette 21 is dropped and shocked, the improved flexural strength can inhibit the occurrence of a wobble between the top plate 27 and the anisotropic heat transfer plate 59, caused by a bend and separation of the anisotropic heat transfer plate 59 from the detection panel 35.

Since the first adhesive layer 70 is composed of the plural adhesive sections 70a to 70d, it is possible to prevent the occurrence of air bubbles within the adhesive layer 70 when gluing the top plate 27 to the anisotropic heat transfer plate 59. This brings about ease of gluing operation. Furthermore, pressure fluctuation between the top plate 27 and the anisotropic heat transfer plate 59 due to temperature change does not affect an adhesive state between the top plate 27 and the anisotropic heat transfer plate 59, because gaps between the adhesive sections 70a to 70d function as air vents. When the top plate 27 needs replacing due to a scratch or dirt, use of the first adhesive layer 70 can ease removal of the top plate 27 from the anisotropic heat transfer plate 59, as compared with the case of gluing the entire top plate 27. Thus, the first adhesive layer 70 can ease replacement of the top plate 27.

Note that, the first adhesive layer 70 for gluing the top plate 27 and the anisotropic heat transfer plate 59 and the second adhesive layer 72 for gluing the anisotropic heat transfer plate 59 and the detection panel 35 may use any type of adhesives, glues, or double-faced tapes.

Figure 8:
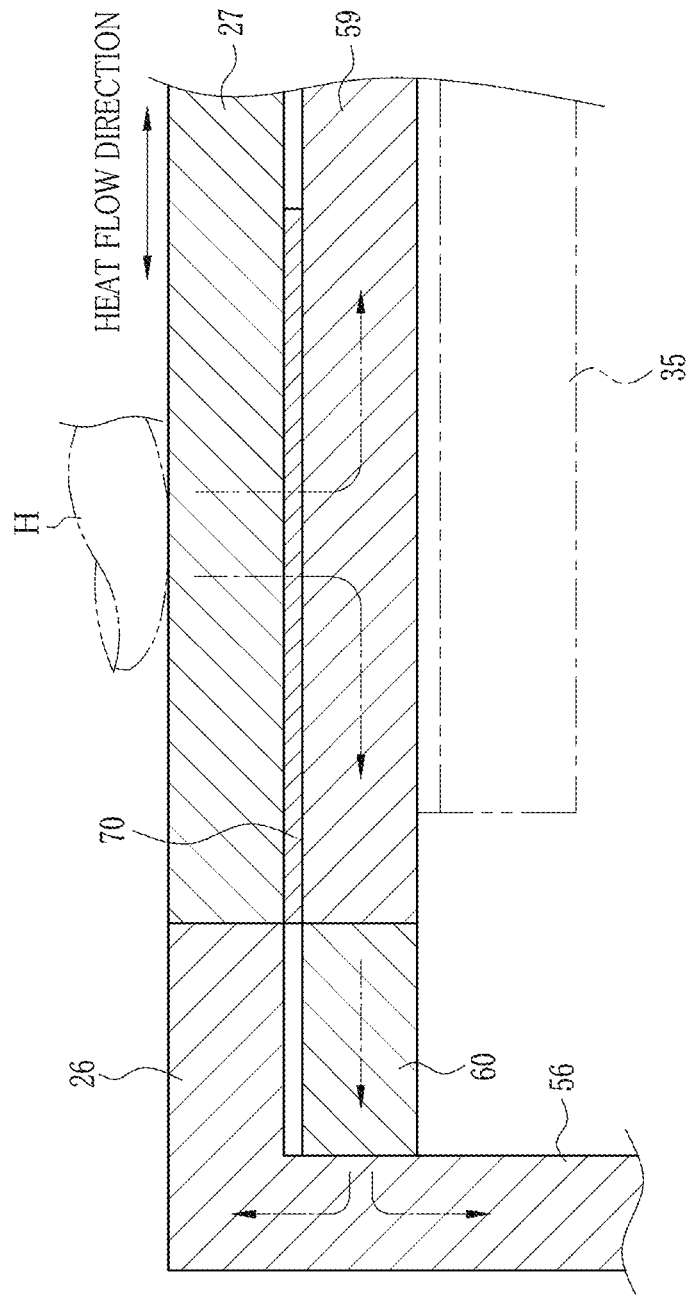
FIG. 8 is a sectional view of a heat transfer state of the top plate and the anisotropic heat transfer plate.

As shown in FIG. 8, when radiography is performed in such a state that the body part e.g. a finger of the patient H is in contact with the top plate 27, the body heat of the patient H is transferred to the top plate 27 at a portion contacting the finger. The heat of the contact portion is transferred to the other portions with lower temperature, in other words, in a plane direction and a thickness direction of the top plate 27. As for the plane direction, the heat of the top plate 27 is transferred in the first prepregs 81 in the heat flow direction, and is released from the housing 26. As for the thickness direction, the heat of the top plate 27 reaches the first prepreg 81a being the lowermost layer, and is transferred to the anisotropic heat transfer plate 59 under the first prepreg 81a. Since the heat flow direction of the anisotropic heat transfer plate 59 is the same as that of the first prepreg 81a, the heat from the top plate 27 is efficiently transferred to the anisotropic heat transfer plate 59.

As indicated by arrows of alternate long and short dashed lines, the anisotropic heat transfer plate 59 transfers the heat from the top plate 27 in the heat flow direction orthogonal to the signal line direction. The heat absorbing members 60 transfer the heat from the anisotropic heat transfer plate 59 to the housing 26. Thus, the heat transferred from the finger of the patient H to the top plate 27 is released from the housing 26 with a relatively large surface, so it is possible to prevent the occurrence of temperature variations in the detection panel 35. The heat of the patient H transferred to the top plate 27 is not transferred in the signal line direction, that is, in a direction of the readout circuit 49. This can prevent the occurrence of noise caused by temperature increase of the readout circuit 49. Both the top plate 27 and the anisotropic heat transfer plate 59 made of the CFRP have a coefficient of thermal expansion of 6 PPM, which is similar order to a coefficient of thermal expansion of 3 PPM of the glass substrate 71 of the detection panel 35. Thus, it is possible to prevent the occurrence of warping caused by difference in the coefficients of thermal expansion.

In the concrete, the top plate 27 and the anisotropic heat transfer plate 59 are preferably made of a pitch-based carbon sheet formed of pitch-based carbon fiber, for example. The pitch-based carbon fiber is a type of carbon fiber obtained by carbonization of pitch precursor (pitch fiber derived from coal tar or heavy oil), and has the advantage of lightweight and high thermal conductivity, as compared with pan-based carbon fiber made of acrylic fiber. The pitch-based carbon sheet is classified into a short fiber type and a long fiber type, in accordance with the length of the fiber. The long fiber type is preferably used because its thermal conductivity is the same as or more than that of metal.

As described above, according to the present invention, when the temperature of the top plate 27 is partly increased, the anisotropic heat transfer plate 59 disperses the heat in its plane and evens the temperature, and therefore temperature variations do not likely occur in the detection surface 38 of the detection panel 35. Thus, it is possible to prevent the occurrence of density variations in an image. As described above, slimming is required of the housing 26 of the electronic cassette 21. Furthermore, in the case of the ISS method, the detection panel 35 is disposed near the top plate 27. Therefore, the present invention is highly effective.

Figure 9:
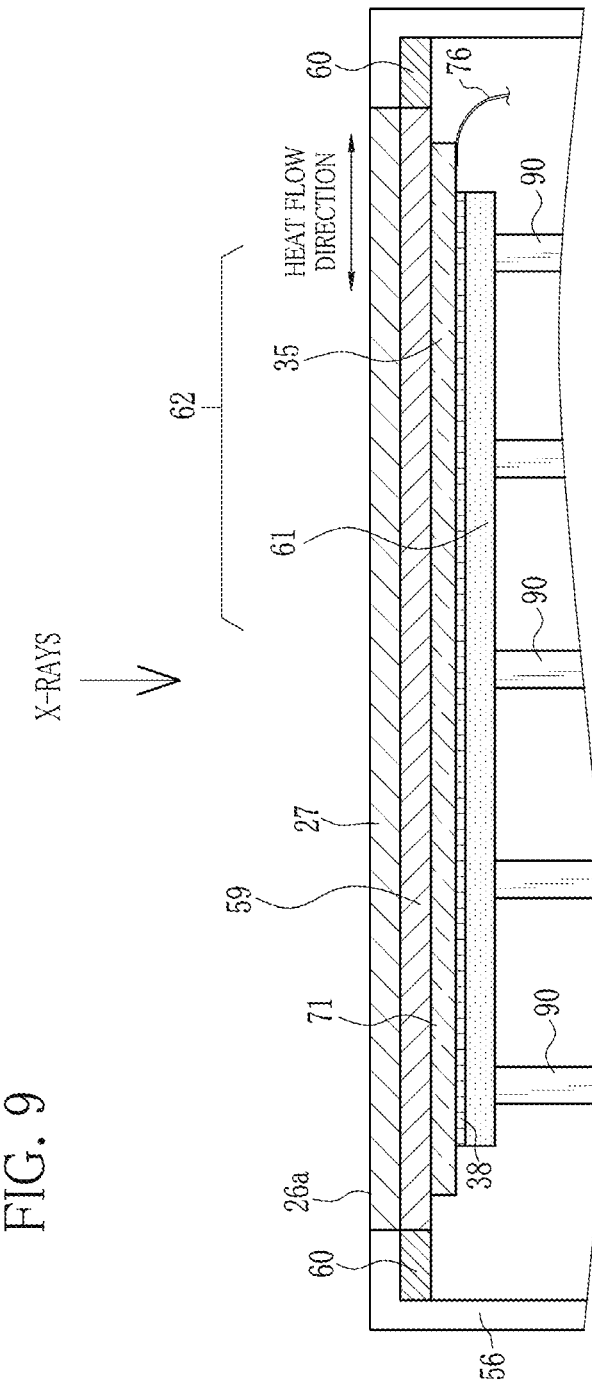
FIG. 9 is a sectional view showing a state of securing the anisotropic heat transfer plate to the top plate by ribs.

In the above embodiment, the top plate 27 and the anisotropic heat transfer plate 59 are glued together with the adhesive layer having the plural adhesive sections 70a to 70d. The anisotropic heat transfer plate 59 and the detection panel 35 may be glued together with an adhesive layer having plural adhesive sections, in addition to or instead of the gluing between the top plate 27 and the anisotropic heat transfer plate 59. The top plate 27, the anisotropic heat transfer plate 59, and the detection panel 35 are not necessarily glued to one another. For example, as shown in FIG. 9, the top plate 27, the anisotropic heat transfer plate 59, and the detection panel 35 may come into contact with one another without being glued, by pressing the detection panel 35 and the anisotropic heat transfer plate 59 against the top plate 27 with pressure by ribs 90 projecting from the rear frame 57 of the housing 26.

In the above embodiment, the body heat of the patient H is transferred to the top plate 27 by contact of the patient's body to the top plate 27. The top plate 27 composing an exterior surface of the housing 26 is susceptible to various thermal interferences depending on environment of the housing 26, other than the body heat of the patient H. Even in a case where such a thermal interference causes partial temperature increase of the top plate 27, the present invention has the same effect as described above.

According to the above embodiment, in the detection panel 35, the pixels 37 composing the detection surface 38 are formed in the glass substrate 71, but a transparent thin resin sheet having high X-ray transparency may be used instead of the glass substrate 71. Without using any substrate such as the glass substrate 71, the pixels 37 may be formed on the scintillator 61 to form a detection section having the detection surface 38. When the thin resin sheet or the scintillator 61 is used instead of the glass substrate 71, the temperature of the top plate 27 is transferred to the detection surface 38 more easily, so the present invention is highly effective. In a case where the detection section 38 and the housing 26 having the top plate 27 are made flexible, the housing 26 is made further thinner. Thus, the present invention becomes more beneficial.

In the above embodiment, a pitch-based carbon material is used as a material of the top plate 27 and the anisotropic heat transfer plate 59, but a pan-based carbon material may be used instead. The above embodiment is described with taking the electronic cassette 21 of the half size as an example, but the present invention is applicable to an electronic cassette of another size. The present invention is applicable not only to the portable electronic cassette 21, but also to a mammographic system or to a radiation image capturing apparatus in which a radiation imaging device is built into an upright or horizontal imaging support.

In the above embodiment, the photoelectric conversion film of the photodiode 42 is made of a-Si, but may be made of a material containing an organic photoelectric conversion material. In this case, an absorption spectrum has its peak mainly in a visible light range. Thus, the photoelectric conversion film hardly absorbs electromagnetic waves other than the visible light emitted from the scintillator 61, so it is possible to prevent the occurrence of noise caused by the absorption of the radiation such as the X-rays or γ-rays by the photoelectric conversion film. The photoelectric conversion film of the organic photoelectric conversion material is formed by deposition of the organic photoelectric conversion material on the detection panel 35 using a liquid droplet discharge head such as an inkjet head. In manufacturing the photoelectric conversion film, heat resistance is not required of the detection panel 35. Thus, a substrate made of a material other than glass becomes usable.

When the photoelectric conversion film of the photodiode 42 is made of the organic photoelectric conversion material, the photoelectric conversion film hardly absorbs the radiation. Thus, in the ISS method in which the radiation transmits through the detection panel 35, it is possible to reduce the attenuation of the radiation caused by the transmission through the detection panel 35, and to prevent reduction of sensitivity to the radiation. Therefore, making the photoelectric conversion film out of the organic photoelectric conversion material is especially suitable to the ISS method.

The closer an absorption peak wavelength of the organic photoelectric conversion material to an emission peak wavelength of the scintillator 61, the more efficiently the photoelectric conversion film absorbs the light emitted from the scintillator 61. The absorption peak wavelength of the organic photoelectric conversion material ideally coincides with the emission peak wavelength of the scintillator 61. If not, when the difference between the absorption peak wavelength and the emission peak wavelength is small, the light emitted from the scintillator 61 can be efficiently absorbed. More specifically, the difference between the absorption peak wavelength of the organic photoelectric conversion material and the emission peak wavelength of the scintillator 61 in response to the radiation is preferably 10 nm or less, and more preferably 5 nm or less.

As the organic photoelectric conversion material satisfying such a condition, there are quinacridone organic compounds and phthalocyanine organic compounds, for example. Since the absorption peak wavelength of quinacridone in the visible light range is 560 nm, using the quinacridone as the organic photoelectric conversion material and using CsI(Tl) as a material of the scintillator 61 make it possible to restrain the difference between the peak wavelengths within 5 nm, and produce an approximately maximum amount of electric charge in the photoelectric conversion film.

The photoelectric conversion film applicable to the detection panel 35 will be concretely described. In the detection panel 35, the upper and lower electrodes and an organic layer including the photoelectric conversion film sandwiched between the upper and lower electrodes correspond to an electromagnetic wave absorption and photoelectric conversion portion. This organic layer is specifically composed of an electromagnetic wave absorbing portion, a photoelectric conversion portion, an electron transport portion, a positive hole transport portion, an electron blocking portion, a positive hole blocking portion, a crystallization preventing portion, an electrode, an interlayer contact improving portion, and the like that are stacked or mixed.

The above organic layer preferably contains an organic p-type compound or an organic n-type compound. The organic p-type semiconductor (compound) is a donor organic semiconductor (compound) mainly typified by a hole transport organic compound, and has the property of donating electrons. In more detail, when two types of organic materials are used in contact with each other, the organic p-type semiconductor (compound) is an organic compound having less ionization potential. Accordingly, any organic compound is available as the donor organic compound as long as the organic compound can donate the electrons. The organic n-type semiconductor (compound) is an acceptor organic semiconductor (compound) mainly typified by an electron transport organic compound, and has the property of accepting the electrons. In more detail, when two types of organic materials are used in contact with each other, the organic n-type semiconductor (compound) is an organic compound having more electron affinity. Therefore, any organic compound is usable as the acceptor organic compound as long as the organic compound is electron-acceptable.

Materials usable as the organic p-type semiconductor and the organic n-type semiconductor and the structure of the photoelectric conversion film are described in U.S. Pat. No. 7,847,258 corresponding to Japanese Patent Laid-Open Publication No. 2009-32854 in detail, so description thereof will be omitted.

The photodiode 42 may have any structure as long as it includes at least the upper and lower electrodes and the photoelectric conversion film sandwiched between the upper and lower electrodes. However, to prevent increase in dark current, the photodiode 42 preferably has one of an electron blocking layer and a hole blocking layer, and more preferably has both.

The electron blocking layer can be provided between the upper electrode and the photoelectric conversion film. When bias voltage is applied between the upper electrode and the lower electrode, the electron blocking layer prevents increase of the dark current by infusion of electrons from the upper electrode to the photoelectric conversion film. An electron donating organic material is used as the electron blocking layer. The concrete material of the electron blocking layer is chosen in accordance with the materials of the adjoining electrode and the adjoining photoelectric conversion film, and preferably has an electron affinity (Ea) by 1.3 eV or more larger than the work function (Wf) of the material of the adjoining electrode, and preferably has an ionization potential (Ip) equal to or less than the IP of the material of the adjoining photoelectric conversion film. The materials usable as the electron donating organic material are described in the U.S. Pat. No. 7,847,258 in detail, and the description thereof will be omitted.

The thickness of the electron blocking layer is preferably 10 nm or more and 200 nm or less, more preferably 30 nm or more and 150 nm or less, most preferably 50 nm or more and 100 nm or less, in order to certainly bring out a dark current restriction effect and prevent reduction of the photoelectric conversion effect of the photodiode 42.

The hole blocking layer can be provided between the photoelectric conversion film and the lower electrode. When the bias voltage is applied between the upper electrode and the lower electrode, the hole blocking layer prevents increase of the dark current by infusion of holes from the lower electrode to the photoelectric conversion film. An electron accepting organic material is used in the hole blocking layer. The concrete material of the hole blocking layer is chosen in accordance with the materials of the adjoining electrode and the adjoining photoelectric conversion film, and preferably has an ionization potential (Ip) by 1.3 eV or more larger than the work function (Wf) of the material of the adjoining electrode, and preferably has an electron affinity (Ea) equal to or larger than the Ea of the material of the adjoining photoelectric conversion film. The materials usable as the electron accepting organic material are described in the U.S. Pat. No. 7,847,258 in detail, and the description thereof will be omitted.

The thickness of the hole blocking layer is preferably 10 nm or more and 200 nm or less, more preferably 30 nm or more and 150 nm or less, most preferably 50 nm or more and 100 nm or less, in order to certainly bring out the dark current restriction effect and prevent reduction of the photoelectric conversion effect of the photodiode 42.

Note that, if the bias voltage is applied such that the holes of the electric charge produced in the photoelectric conversion film move to the lower electrode and the electrons move to the upper electrode, the positions of the electronic blocking layer and the hole blocking layer are preferably reversed. Both the electron blocking layer and the hole blocking layer are not necessarily provided. Providing one of the electron blocking layer and the hole blocking layer allows obtainment of a certain degree of the dark current restriction effect.

As an amorphous oxide for forming the active layer of the TFT 43, oxides (for example, In—O oxide) containing at least one of In, Ga, and Zn are preferable, and oxides (for example, In—Zn—O oxide, In—Ga—O oxide, and Ga—Zn—O oxide) containing at least two of In, Ga, and Zn are more preferable, and oxides containing all of In, Ga, and Zn are most preferable. As In—Ga—Zn—O amorphous oxide, an amorphous oxide of a composition represented by $InGaO_3(ZnO)m$ (m represents natural number less than 6) in a crystalline state is preferable, and especially, $InGaZnO_4$ is more preferable. Note that, the amorphous oxide for forming the active layer is not limited to above.

An organic semiconducting material for forming the active layer includes a phthalocyanine compound, pentacene, vanadyl phthalocyanine, or the like, but is not limited to them. The composition of the phthalocyanine compound is described in U.S. Pat. No. 7,768,002 corresponding to the Japanese Patent Laid-Open Publication No. 2009-212389 in detail, so the description thereof will be omitted.

Forming the active layer of the TFT 43 out of one of the amorphous oxides, the organic semiconducting material, a carbon nanotube, and the like can effectively restrict the occurrence of noise, because these materials do not or hardly absorb radiation such as the X-rays.

Forming the active layer of the carbon nanotube can accelerate the switching speed of the TFT 43, and reduce the degree of absorption of light in the visible light range by the TFT 43. When the active layer is formed of the carbon nanotube, the performance of the TFT 43 significantly degrades only by mixture of a slight amount of metal impurity into the active layer. Thus, it is necessary to isolate and extract the carbon nanotube of extremely high purity by centrifugation or the like, for use in the formation of the active layer.

Any of the film of the organic photoelectric conversion material and the film of organic semiconducting material has sufficient flexibility. Thus, a combination of the photoelectric conversion film made of the organic photoelectric conversion material and the TFT 43 having the active layer made of the organic semiconducting material does not necessarily require high rigidity of the detection panel 35 to which the weight of the patient H is applied as a load.

The substrate of the detection panel 35 can be made of any material as long as it is light transparent and has low radiation absorptivity. Both the amorphous oxide for making the active layer of the TFT 43 and the organic photoelectric conversion material for making the photoelectric conversion film of the photodiode 42 can be deposited at low temperature. Thus, the substrate of the detection panel 35 can be made of not only a heat-resistant material such as semiconductor, quartz, and glass, but also flexible plastic, aramid, and bio-nanofiber. To be more specific, a flexible substrate made of polyester including polyethylene terephthalate, polybutylene phthalate, and polyethylene naphthalate, polystyrene, polycarbonate, polyether sulfone, polyalirate, polyimid, polycycloolefin, norbornene resin, poly(chlorotrifluoroethylene), or the like is available. Using the flexible substrate made of the plastic contributes to weight reduction and ease of portability. Note that, the substrate of the detection panel 35 may be provided with an insulating layer for securing insulation, a gas barrier layer for preventing transmission of moisture and oxygen, an undercoat layer for improving flatness and adhesion to the electrode, and the like.

Since the aramid can be subjected to high temperature process of 200° C. or more, a transparent electrode material can be cured at high temperature with reduction of resistance therein, and automatic mounting of a driver IC including a reflow soldering can be performed. The aramid has a coefficient of thermal expansion close to those of ITO (indium tin oxide) and the glass substrate, and hence is hard to warp and crack after manufacture. The aramid substrate can be thinner than the glass substrate. Note that, to form the substrate of the detection panel 35, an ultra-slim glass substrate may be laminated with the aramid.

The bio-nanofiber is a complex of a cellulose microfibril bundle (bacterial cellulose) produced by bacteria (acetobacter xylinum) and transparent resin. The cellulose microfibril bundle has a width of 50 nm, being one-tenth of the wavelength of the visible light, and high strength, high elasticity, and low thermal expansion. Impregnating the transparent resin such as acrylic resin or epoxy resin to the bacterial cellulose and hardening it make it possible to obtain the bio-nanofiber that contains fiber at 60 to 70% and has light transmittance of approximately 90% at a wavelength of 500 nm. The bio-nanofiber has a low coefficient of thermal expansion (3 to 7 ppm) comparable to a silicon crystal, high strength (460 MPa) comparable to steel, high elasticity (30 GPa), and flexibility. Therefore, the substrate of the detection panel 35 of the bio-nanofiber can be thinner than that of the glass.

When the glass substrate 71 is used as the substrate of the detection panel 35, the thickness of the entire detection panel 35 is of the order of 0.7 mm, for example. On the contrary, through the use of a thin substrate made of the light transparent plastic, the thickness of the entire detection panel 35 can be thinned to the order of 0.1 mm, for example, and the detection panel 35 is made flexible. The flexibility of the detection panel 35 improves impact resistance of the electronic cassette 21, so the electronic cassette 21 becomes hard to break. Any of the plastic resin, the aramid, the bio-nanofiber, and the like hardly absorbs the radiation. Thus, when the substrate of the detection panel 35 is formed of these materials, the substrate hardly absorbs the radiation. Therefore, even in the ISS method in which the radiation transmits through the detection panel 35, sensitivity to the radiation is not degraded.

The pixels 37 including the photodiode 42 and the TFT 43 are used in the above embodiment, but a CMOS sensor or an organic CMOS sensor that uses the organic photoelectric conversion material in the photodiodes may be used instead. The CMOS sensor or the organic CMOS sensor, which use single crystalline silicon in its substrate, have faster carrier mobility by three to four digits than that of the photoelectric converters of the amorphous silicon, and have high radiation transmittance. Thus, the CMOS sensor or the organic CMOS sensor is suitably used in the radiation detector of the ISS method. Note that, the organic CMOS sensor is described in detail in United States Patent Application Publication No. 2009/224162 corresponding to Japanese Patent Laid-Open Publication No. 2009-212377, so detailed description thereof will be omitted.

To impart flexibility to the CMOS sensor or the organic CMOS sensor, the CMOS sensor or the organic CMOS sensor may be made of organic thin film transistors formed on a plastic film. The organic thin film transistor is described in detail in Tsuyoshi SEKITANI et al. "Flexible organic transistors and circuits with extreme bending stability" published in Nature Materials 9 on Nov. 7, 2010 on pages 1015-1022, so detailed description thereof will be omitted.

To impart flexibility to the CMOS sensor or the organic CMOS sensor, photodiodes and the transistors made of single crystalline silicon may be laid out on the flexible plastic substrate. To lay out the photodiodes and the transistors on the plastic substrate, for example, a fluidic self-assembly (FSA) method is available in which device blocks of the order of several tens of micrometers are dispersed in a solution to lay out the device blocks in necessary arbitrary positions on the substrate. Note that, the FSA method is described in detail in Koichi MAEZAWA et al. "Fabrication of Resonant Tunneling Device Blocks for Fluidic Self-Assembly" IEICE Technical Report, Vol. 108, No. 87, pages 67-72, June 2008, so detailed description thereof will be omitted.

The above embodiment is described with taking the X-rays as an example of the radiation, but the present invention is applicable to a device using another type of radiation such as γ-rays.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation imaging device comprising:
    a radiation detector for detecting radiation transmitted through an object to be examined, said radiation detector having a scintillator and a detection panel, said scintillator converting said radiation incident upon an incident surface into visible light, said detection panel having a detection surface having a two-dimensional array of pixels each for converting said visible light emitted from said scintillator into an electric signal, said detection surface being opposed to said incident surface of said scintillator;
    a housing having a top plate in an irradiation surface irradiated with said radiation, said housing contains said radiation detector in such a position that said detection panel is faced to said top plate; and
    an anisotropic heat transfer plate disposed between said top plate and said detection panel in said housing so as to make tightly contact with both said top plate and said detection panel, for transferring heat in a specific first direction.

2. The radiation imaging device according to claim 1, wherein said first direction of said anisotropic heat transfer plate differs from an extending direction of a signal line for reading out said electric signal from said pixels of said detection panel.

3. The radiation imaging device according to claim 1, wherein said anisotropic heat transfer plate has a plurality of carbon fibers oriented in one direction, and said first direction of said anisotropic heat transfer plate coincides with an orientation of said carbon fibers.

4. The radiation imaging device according to claim 1, wherein
    each of said top plate and said anisotropic heat transfer plate is formed of a lamination of prepregs, and each of said prepregs is made of carbon fibers oriented in one direction and impregnated with resin;
    in said anisotropic heat transfer plate, said orientation of said carbon fibers of all said prepregs are substantially same, and said first direction of said anisotropic heat transfer plate coincides with said orientation of said carbon fibers;
    in said top plate, said orientation of said carbon fibers differs between any of said two prepregs overlapping each other; and
    said orientation of said carbon fibers of said prepreg of a lowermost layer of said top plate corresponding to a rear surface of said top plate is substantially same as said orientation of said carbon fibers of said prepregs of said anisotropic heat transfer plate.

5. The radiation imaging device according to claim 4, wherein said carbon fibers are pitch-based carbon fibers.

6. The radiation imaging device according to claim 4, wherein said top plate, said anisotropic heat transfer plate, and said detection panel are joined with pressure.

7. The radiation imaging device according to claim 4, wherein said top plate, said anisotropic heat transfer plate, and said detection panel are bonded to each other.

8. The radiation imaging device according to claim 7, wherein
    said top plate and said anisotropic heat transfer plate are glued together with a first adhesive layer;
    said anisotropic heat transfer plate and said detection panel are glued together with a second adhesive layer; and
    at least one of said first and second adhesive layers is composed of plural adhesive sections arranged in a direction orthogonal to said orientation of said carbon fibers of said anisotropic heat transfer plate.

9. The radiation imaging device according to claim 8, wherein said anisotropic heat transfer plate is provided with a heat absorbing member on a side in said first direction.

10. The radiation imaging device according to claim 9, wherein said heat absorbing member is thermally bonded to said housing.

11. The radiation imaging device according to claim 4, wherein said housing is in shape of a box having a front frame and a rear frame, and said top plate is fitted into said front frame.

12. The radiation imaging device according to claim 11, wherein said front frame and said rear frame are made of metal.

13. The radiation imaging device according to claim 12, wherein
    said anisotropic heat transfer plate and said radiation detector are attached to said front frame; and
    a base board for blocking said radiation is attached to said rear frame, and at least one circuit board is mounted on a rear surface of said base board.

14. The radiation imaging device according to claim 13, wherein said detection panel and said circuit board are connected with at least one flexible cable, and said flexible cable extends from a side of said detection panel in said extending direction of said signal line, and said flexible cable is mounted with an IC chip designed for reading out said electric signal from each of said pixels of said detection panel.

15. The radiation imaging device according to claim 14, wherein said anisotropic heat transfer plate is provided with a heat absorbing member on a side in said first direction, and said heat absorbing member makes contact with said front frame of said housing.

16. The radiation imaging device according to claim 4, wherein each of said pixels has a photodiode made of amorphous silicon.

17. The radiation imaging device according to claim 4, wherein each of said pixels has a photodiode made of an organic photoelectric conversion material.

\* \* \* \* \*